United States Patent
Ashwood et al.

(10) Patent No.: US 12,111,514 B1
(45) Date of Patent: Oct. 8, 2024

(54) EYEWEAR DEVICE WITH THERMAL MANAGEMENT DEVICE

(71) Applicants: Andrea Ashwood, Culver City, CA (US); Emily Clopp, Santa Monica, CA (US); Stephen Steger, Los Angeles, CA (US)

(72) Inventors: Andrea Ashwood, Culver City, CA (US); Emily Clopp, Santa Monica, CA (US); Stephen Steger, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 212 days.

(21) Appl. No.: 17/411,220

(22) Filed: Aug. 25, 2021

Related U.S. Application Data

(60) Provisional application No. 63/085,325, filed on Sep. 30, 2020.

(51) Int. Cl.
*G02C 5/14* (2006.01)
*G02C 11/00* (2006.01)

(52) U.S. Cl.
CPC ............... *G02C 5/14* (2013.01); *G02C 11/10* (2013.01)

(58) Field of Classification Search
CPC .................................. G02C 5/14; G02C 11/10
See application file for complete search history.

(56) References Cited

U.S. PATENT DOCUMENTS

| | | | |
|---|---|---|---|
| 9,740,023 B1 * | 8/2017 | Ashwood | G02C 5/001 |
| 11,112,619 B1 * | 9/2021 | Romano | G02C 5/008 |
| 2019/0198983 A1 * | 6/2019 | Moore | G02B 27/017 |
| 2019/0369402 A1 * | 12/2019 | Woodman | H04N 23/57 |
| 2021/0098837 A1 * | 4/2021 | Ashwood | G02C 11/10 |
| 2022/0346277 A1 * | 10/2022 | Yoon | G02B 27/0176 |

\* cited by examiner

*Primary Examiner* — Balram T Parbadia
*Assistant Examiner* — Gabriel A Sanz
(74) *Attorney, Agent, or Firm* — CM Law; Stephen J. Weed

(57) ABSTRACT

An electronic eyewear device is presented that includes an eyewear body comprising a frame configured to be worn on the head of a user. The frame includes an optical elements section and spaced-apart first and second temples. The eyewear body includes onboard electronic components carried by the eyewear body that comprises a heat source that generates heat during electrically powered operation of the components. A thermal management device that includes a heat sink within a first temple and a thermal coupling disposed within the first temple and is thermally coupled to the heat source and the heat sink and receives heat from the heat source.

19 Claims, 10 Drawing Sheets

EYEWEAR DEVICE WITH THERMAL MANAGEMENT DEVICE

CROSS-REFERENCE TO RELATED APPLICATIONS

This application claims priority to U.S. Provisional Application Ser. No. 63/085,325 filed on Sep. 30, 2020, the contents of which are incorporated fully herein by reference.

TECHNICAL FIELD

Examples set forth in the present disclosure relate to portable electronic devices, including wearable electronic devices such as eyeglasses. More particularly, but not by way of limitation, the present disclosure describes an electronic eyewear device comprising a thermal management device.

BACKGROUND

Many electronic devices available today include wearable consumer electronic devices. Wearable consumer electronic devices may generate excess heat.

BRIEF DESCRIPTION OF THE DRAWINGS

Features of the various implementations disclosed will be readily understood from the following detailed description, in which reference is made to the appending drawing figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures.

DETAILED DESCRIPTION

Figure 1:
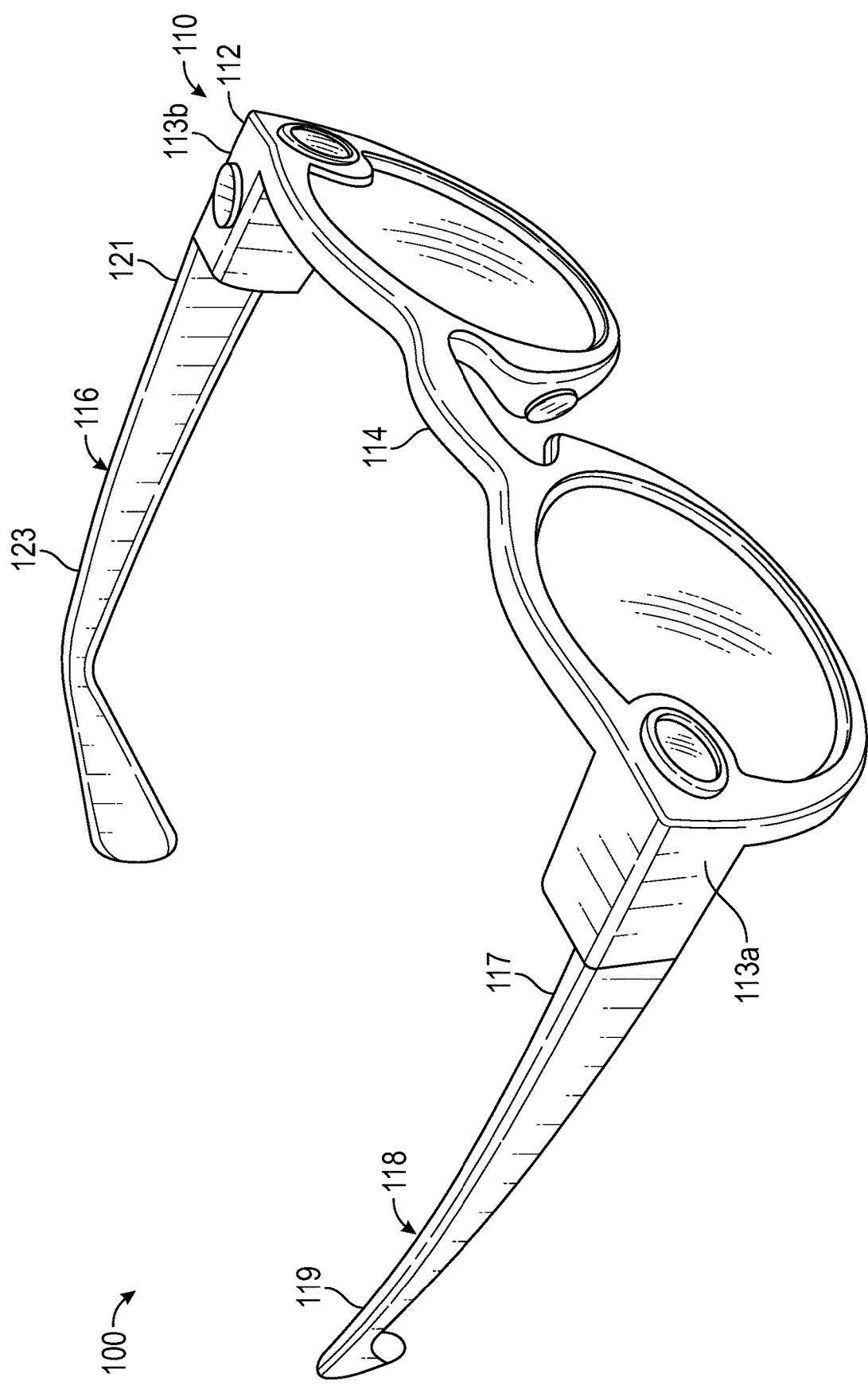
FIG. 1 is a front perspective view of an example electronic eyewear device configuration.

An electronic eyewear device that includes an eyewear body having a frame to be worn on the head of a user. The frame has an optical elements section and spaced-apart first and second temples, with each temple extending rearwardly from the optical elements section. The electronic eyewear device additionally includes onboard electronic components carried by the eyewear body at a first portion that generates heat during operation. A thermal management device that includes a heat sink is positioned within a temple at a second portion of the eyewear body, and a thermal coupling disposed within the temple extends between the heat source and the heat sink such that the thermal management device receives heat from the electronic components. In one example, the thermal management device includes a vapor chamber to disperse heat.

The following detailed description includes systems, methods, techniques, instruction sequences, and computing machine program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and method described because the relevant teachings can be applied or practice in a variety of ways. The terminology and nomenclature used herein is for the purpose of describing particular aspects only and is not intended to be limiting. In general, well-known instruction instances, protocols, structures, and techniques are not necessarily shown in detail.

The term "connect", "connected", "couple" and "coupled" as used herein refers to any logical, optical, physical, or electrical connection, including a link or the like by which the electrical or magnetic signals produced or supplied by one system element are imparted to another coupled or connected system element. Unless described otherwise, coupled or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element integrated into or supported by the element.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

Wearable devices available today generate excessive heat that may impair device function. A wearable device that includes a thermal management device is disclosed. The wearable device includes a body that holds one or more optical elements. It also includes onboard electronic components and a heat source that radiates heat during operation of the components. The device also includes a heat sink at another area of the eyewear body and a thermal coupling disposed within the eyewear body thermally coupled to the heat source and the heat sink to increase heat dissipation of the electronic components.

Figure 2:
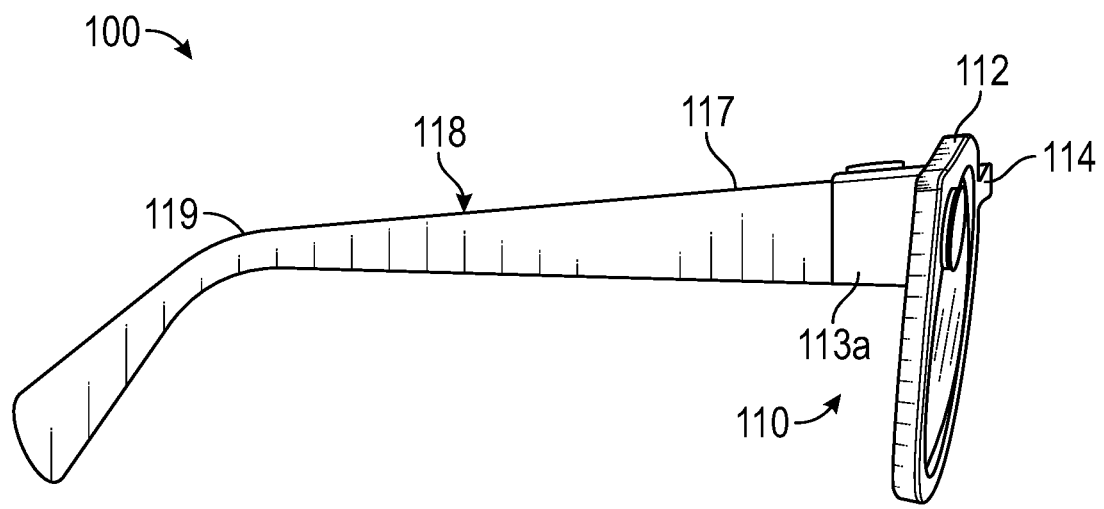
FIG. 2 is a left side view of the electronic eyewear device of FIG. 1.

FIG. 1 is a front perspective view and FIG. 2 is a right side view of electronic eyewear device 100 comprising an eyewear body 110 configured to be worn by a user and hold one or more optical elements within a field of view of the user. In this non-limiting example, eyewear body 110 that includes frame 112 that includes a bridge 114 that is constructed and arranged to sit on the nose, and left and right temples 116, 118. Left temple 116 is coupled to bridge 114 and of sufficient length to extend over the left ear of a user. Right temple 118 is coupled to bridge 114 and extends over the right ear. Right temple 118 includes main section 117 and an ear section 119 and left temple 116 includes main section 121 and ear section 123. Also shown in this view are compartments 113a and 113b for at least partially housing onboard electronic components (shown in FIG. 4). Onboard electronic components may produce excess heat that interferes with normal operation.

Figure 3A:
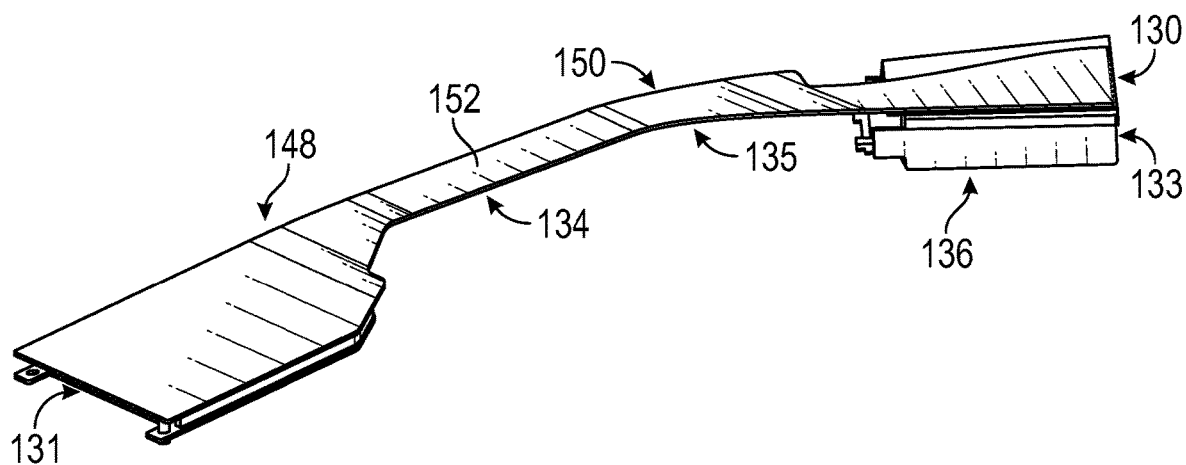
FIG. 3A is a perspective view of a thermal management device of the electronic eyewear device of FIG. 1 in accordance with an example.
Figure 3B:
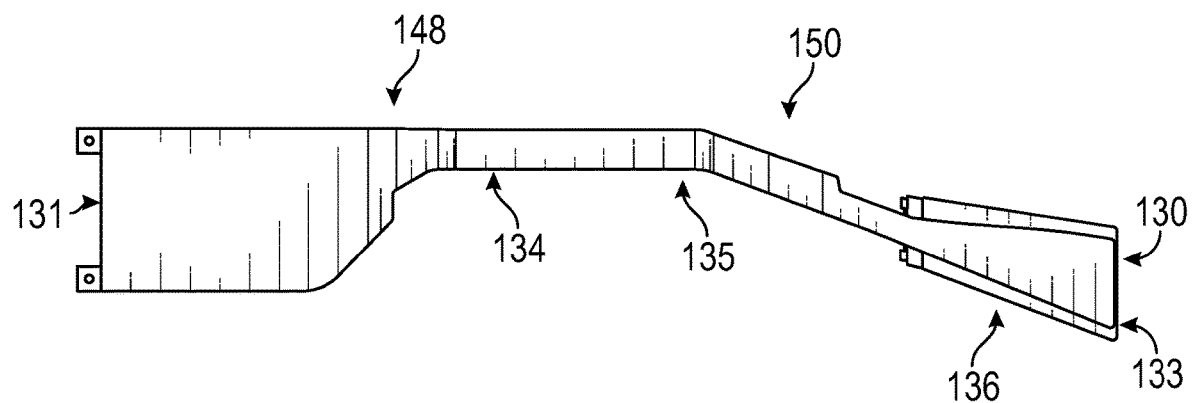
FIG. 3B is a top plan view of the thermal management device of FIG. 3.

FIGS. 3A and 3B show an example thermal management device 130 for managing excess heat to maintain normal operation of electronic eyewear device 100. The onboard electronic components, which are substantially housed within compartments 113a, 113b, produce heat and comprise heat source 132 (see FIGS. 4A and 4B). Thermal management device 130 includes thermal coupling 134 and heat sink 136 that dissipate heat produced by heat source 132. Thermal coupling 134 is in thermal communication with the heat source 132. The thermal coupling is sized to be received in a temple. The thermal coupling 134 is sized to be received in the temple cavity near a compartment 113a, 113b, to maximize surface area for heat transfer and extends rearward through the temple to an angled portion 135 corresponding to the approximate area where the temple would make contact with the user's ear when worn. In some examples, the thermal coupling comprises first and second sections 148, 150. In some examples, the first and second sections are physically separate, or are functionally separate based on coatings or other materials or other treatments or structures that alter their respective physical properties, for example, conductivity.

In some examples, the thermal coupling 134 comprises a vapor chamber 152, such as, but not limited to, a two-phase vapor chamber. In some examples, the vapor chamber 152 is at least partially located within the first section 148 of the thermal coupling 134. In some examples, the vapor chamber 152 is in thermal communication with at least one thermal spreader, for example, a conductive coating or pre-manufactured layer. In some examples, a layer of thermal interface material (TIM) may be interposed between the thermal spreader and the vapor chamber 152. The thermal coupling 134 extends at least partially to heat sink 136 and in the illustrated example, extends to heat sink 136.

Thermal management device 130 further includes heat sink 136. Heat sink 136 can be any thermally conductive structure having lower thermal environment relative to the heat source 132. In some examples, the heat sink 136 is positioned at a second portion of the eyewear body, and in some other examples, the second portion includes or entirely encompasses temple(s) ear portion(s) 119, 123. In one example, the heat sink 136 is a battery shield proximate to a battery such as for powering the onboard electrical components. The battery shield may be at any position within the temple but in some examples are located near the end of the temple.

Figure 4A:
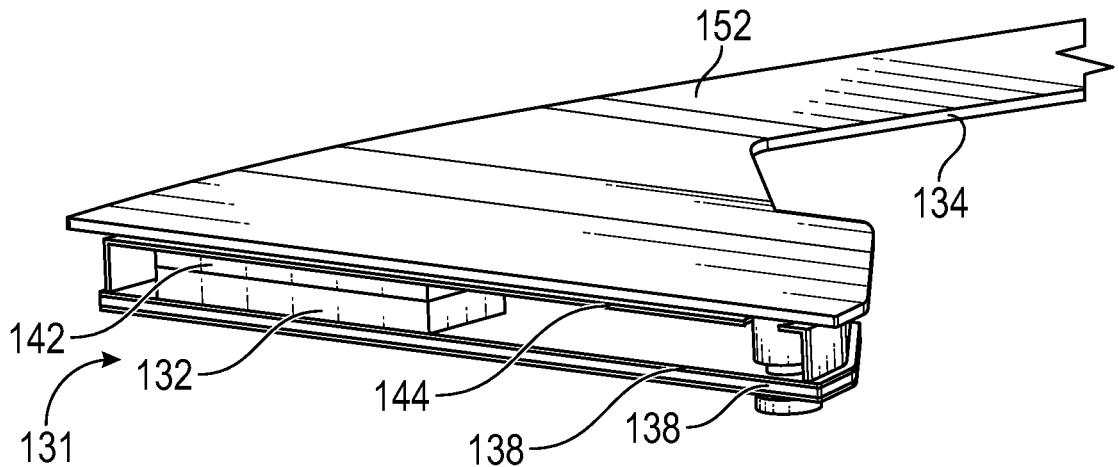
FIG. 4A is a perspective view of one end of the thermal management device of FIG. 3 in accordance with an example.
Figure 4B:
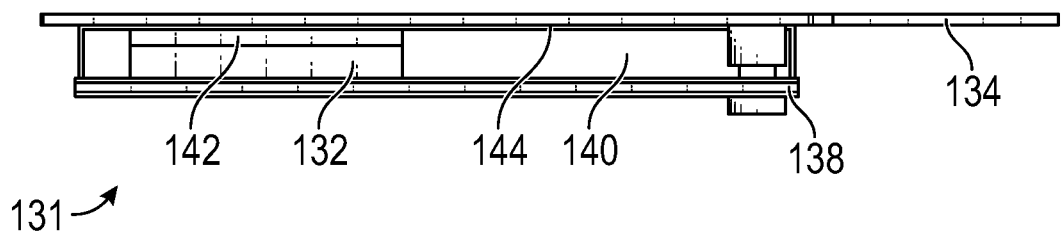
FIG. 4B is an end elevation view of FIG. 4A.
Figure 4C:
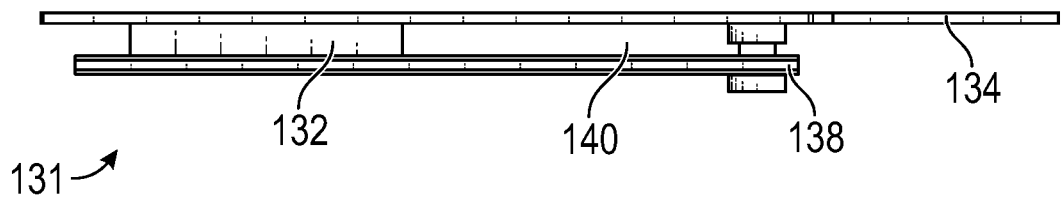
FIG. 4C is an end elevation view of another example thermal management device.

FIGS. 4A and 4B are views of the first end 131 showing the heat source 132 in detail in relation to the thermal coupling 134. As shown, an electrical component (e.g., a printed circuit board) 138 is adjacent to a heat source 132 that draws heat from the component. In this example, the heat source 132 is in further thermal communication with a shield can 144 with an interspersed layer of thermal interface material (TIM) 142 to facilitate heat transfer. A second layer of TIM (not shown) may be provided to further dissipate heat toward the thermal coupling. As noted above, in some examples the thermal coupling 134 is a vapor chamber. As shown in FIG. 4C, in some examples the shield can 144 and the second TIM layer may be omitted such that the vapor chamber 152 is positioned adjacent to the heat source 132.

Figure 5A:
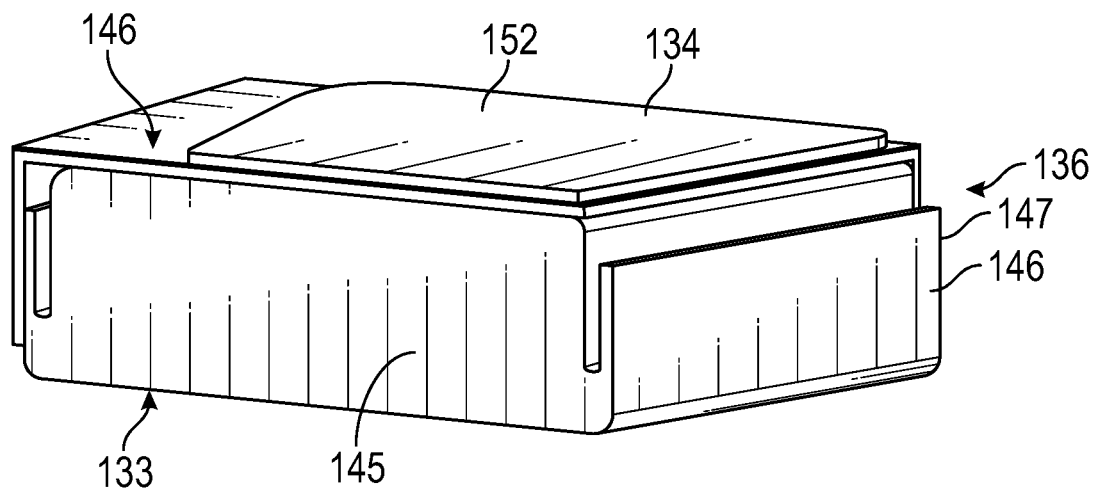
FIG. 5A is a perspective view of a heat sink shown in FIG. 3A in accordance with an example.
Figure 5B:
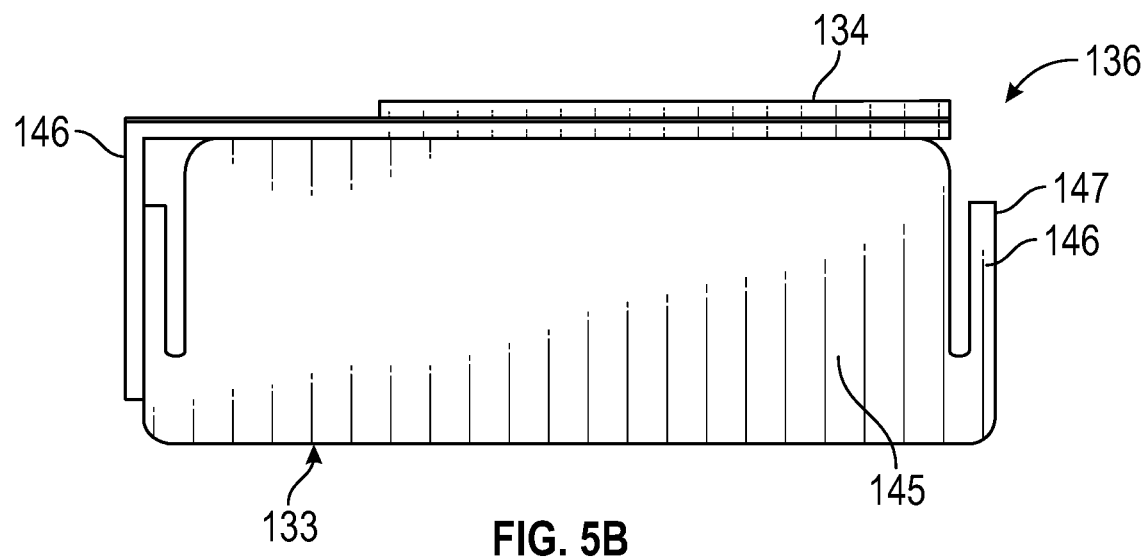
FIG. 5B is an end elevation view of FIG. 5A.

FIGS. 5A and 5B illustrate an example heat sink 136 of FIGS. 3A-3B in further detail. This view shows that the thermal coupling 134 at least partially contacts heat sink 136. As illustrated, heat sink 136 includes a battery shield 146 at least partially enclosing a battery 145 and the battery shield comprises a conductive material which receives thermal energy from thermal coupling 134. In some examples, the battery shield 146 can include extended surfaces 147 that increase the surface area contacting air. As shown, the thermal coupling 134 is a vapor chamber 152 extending from first end 131 to heat sink end 166. The thermal coupling 134 may be affixed directly to the battery shield 146 or may include an intermediate TIM layer to facilitate heat transfer. In some examples, thermal coupling 134 or carrier 156 contacts battery 145 directly. In other examples, thermal coupling 134 or carrier 156 may contact battery 145 through a TIM layer.

Figure 6A:
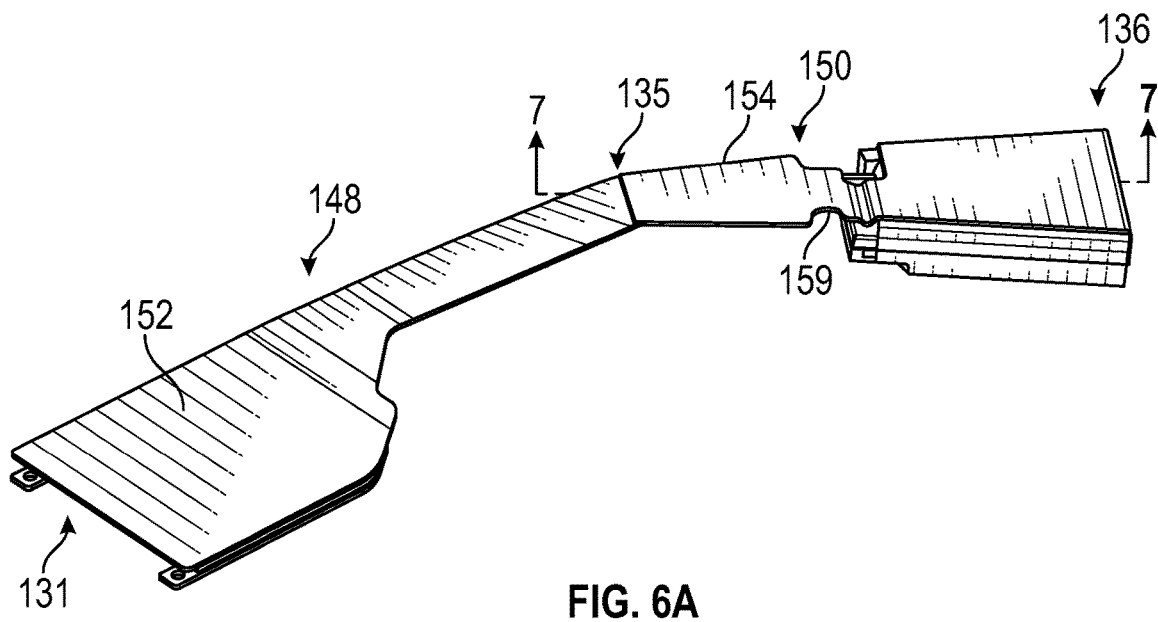
FIG. 6A is a perspective view of a thermal management device in accordance with an example.
Figure 6B:
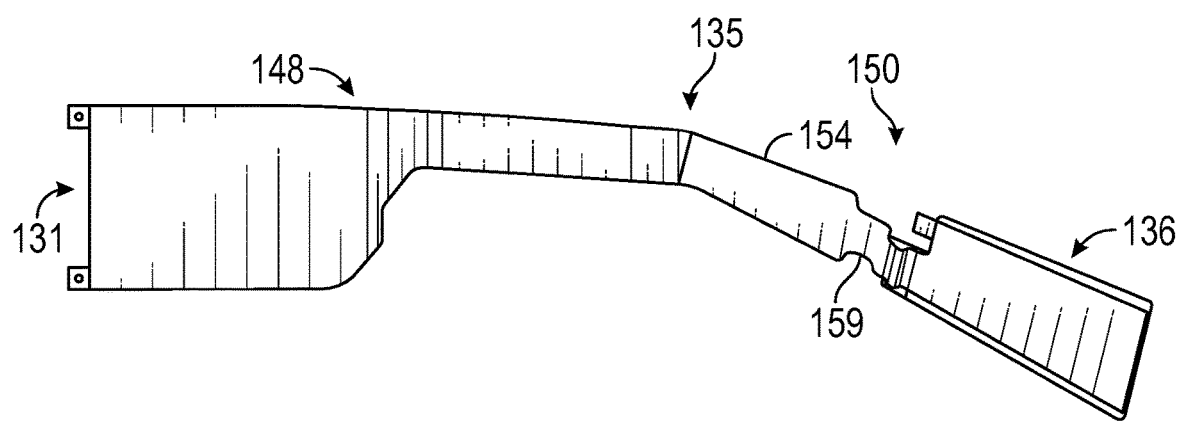
FIG. 6B is a top plan view of the device of FIG. 6A.

FIGS. 6A and 6B illustrate an example configuration of thermal coupling 134 comprising first and second sections 148, 150, where the first section 148 comprises a vapor chamber 152 and the second section 150 comprises a thermal spreader 154, and the first and second sections are in thermal communication and, as shown, are in direct contact, but may consist of a vapor chamber with or without a thermal spreader affixed or coating the vapor chamber. Also as shown, the thermal spreader is attached to a carrier (also shown in FIG. 7) that is in turn in connected to the heat sink 136. The thermal spreader 154 can be any suitable conductive material. In some examples the thermal spreader 154 is graphite or graphite composite. In an example, the at least one thermal spreader 154 is graphite on a plastic film carrier. In some examples, the carrier is a conductive material or composite. In some examples the carrier provides a support for the thermal spreader 154, while in other examples the carrier provides support for the thermal spreader 154 but is itself a conductive material to further transfer thermal energy away from the onboard electronic components. In various examples, the carrier is a plastic or a metal or a metallic composite. In some examples, the carrier is made of aluminum.

Figure 7:
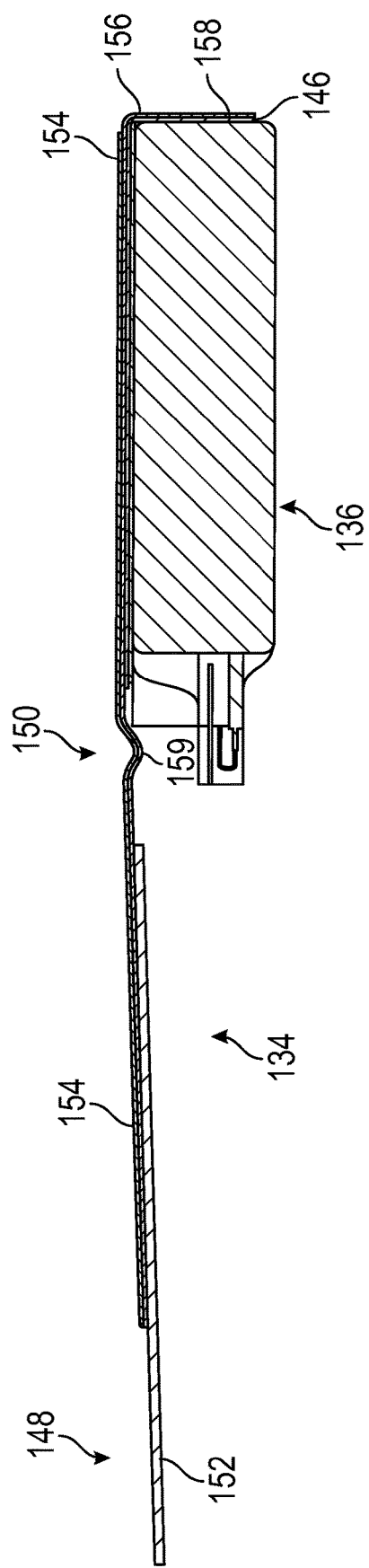
FIG. 7 is a sectional view along line 7-7 of FIG. 6A.

FIG. 7 is a partial sectional view taken along line 7-7 of FIG. 6. FIG. 7 illustrates further detail of the connection of the thermal coupling 134, including the attachment of the carrier 156 to the vapor chamber 152, to the battery shield and maintains the thermal communication of the vapor chamber 152 to the heat sink 136. The first section 148 is partially shown where vapor chamber 152 is in view. Thermal spreader 154 and its carrier 156 are also shown. The thermal spreader 154 is connected, adhered, or otherwise affixed to the vapor chamber. Carrier 156 is affixed to vapor chamber 152 to carry thermal energy from the vapor chamber to the thermal spreader 154 to the heat sink 136. As illustrated, the perimeter of the thermal spreader 154 substantially conforms to the perimeter of the battery shield along its top surface as also shown in FIG. 6, but in some examples, the carrier may at least partially contact other surfaces of the battery shield such as battery shield end 158, or in some examples, the battery directly. The thermal spreader 154 and carrier 156 include a gap area 162 that does not include the vapor chamber but may include a service loop 159 for applications in which the enclosure may bend. In one example the thermal spreader 154 is a graphite spreader with a plastic film carrier. In another example, the thermal spreader 154 is affixed to carrier 156.

Figure 8:
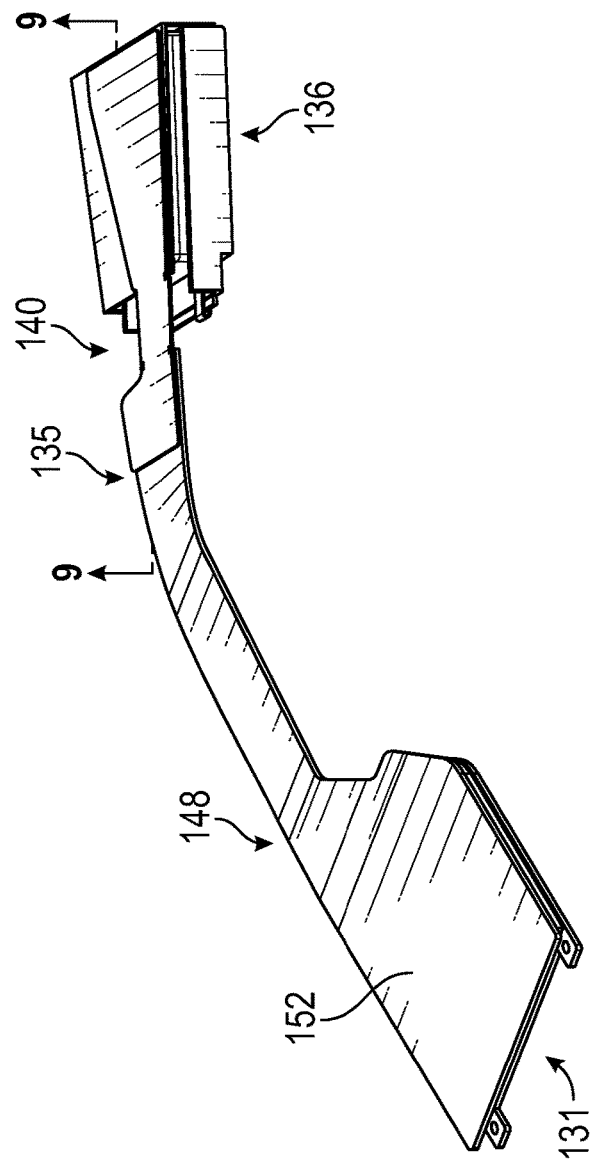
FIG. 8 is a perspective view of another configuration of the thermal management device in accordance with an example.
Figure 9:
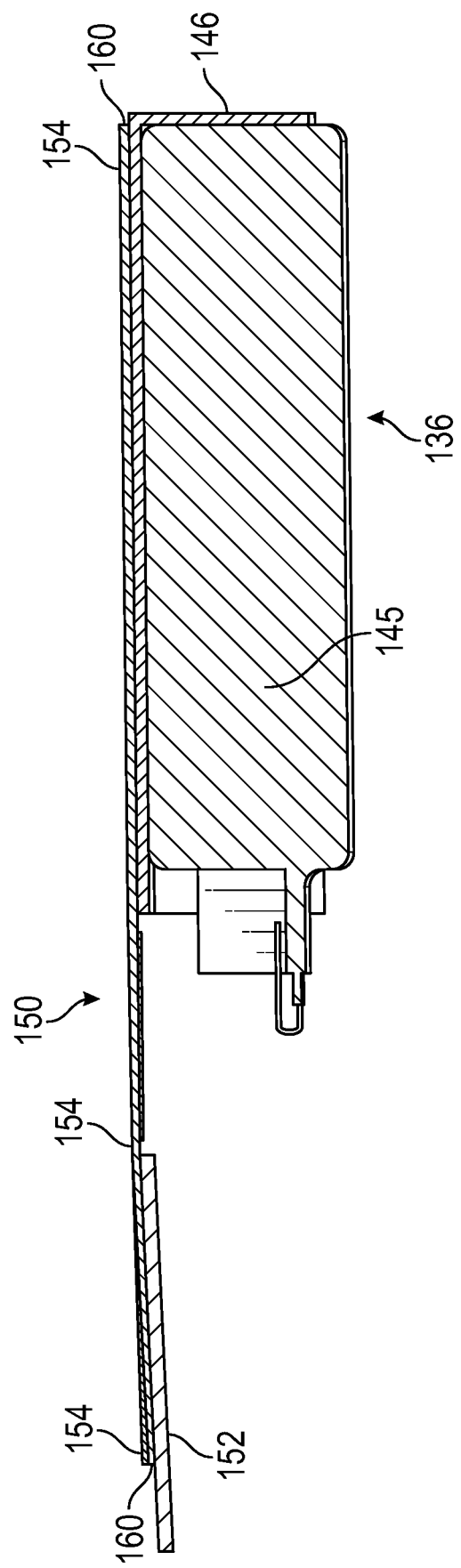
FIG. 9 is a sectional view along line 9-9 of FIG. 8.

As shown in FIGS. 8 and 9, carrier 156 may be composed of one or more metals (for example, aluminum) or metal composites and that may include a thermal interface material layer 160 between at least a portion of the thermal spreader 154 and a portion of the vapor chamber or thermal spreader 154. As shown, the heat sink 136 is a metallic battery shield that allows thermal energy to dissipate from the vapor chamber and thermal spreader 154. FIG. 8 illustrates an example configuration where the thermal coupling 134 extends between the heat source 132 and heat sink 136. The thermal coupling 134 comprises vapor chamber, carrier, thermal spreader, and heat sink. In one aspect, the carrier 156 is wrapped with the thermal spreader 154. The vapor chamber is sized to be received in the temple cavity near the compartment to maximize surface area for heat transfer and extends rearward through the temple to an angled portion 135 corresponding substantially to where the temple is angled approximately where it would make contact with the user's ear when worn. At the angled portion 135, heat is transferred from the vapor chamber to the carrier 156. In some examples the carrier is metal, metallic, or a metal alloy or composite, and in a particular example, substantially comprises aluminum. The carrier 156 may be at least partially enveloped by a thermal spreader (e.g., heat transfer material) by coating, wrapping, affixing, etc. In one example the thermal spreader 154 is graphite, which may be coated on the carrier or adhered and include a plastic backing such as shown in detail below. The carrier 156 contacts the heat sink 136, and as illustrated in the figure, may be a battery shield to dissipate the thermal energy generated by the onboard electronics. In this example, the thermal margin is increased by about 60%. In some examples, the thermal margin is increased by 55% to 65%. In other examples, the thermal margin is increased between 60% and 70%. In some examples, the heat sink 136 may include additional sections of conductive material to facilitate heat transfer.

FIG. 9 is a partial sectional view taken along line 9-9 of the thermal coupling 134 illustrated in FIG. 8. FIG. 9 illustrates the connection of the thermal spreader 154 to the vapor chamber and the battery shield and in particular shows the example of a metal or metal composite carrier and as shown includes a thermal interface material layer between at least a portion of the spreader and a portion of the vapor chamber or spreader. The heat sink 136 is a conductive battery shield that allows thermal energy to dissipate from the vapor chamber and spreader.

Figure 10A:
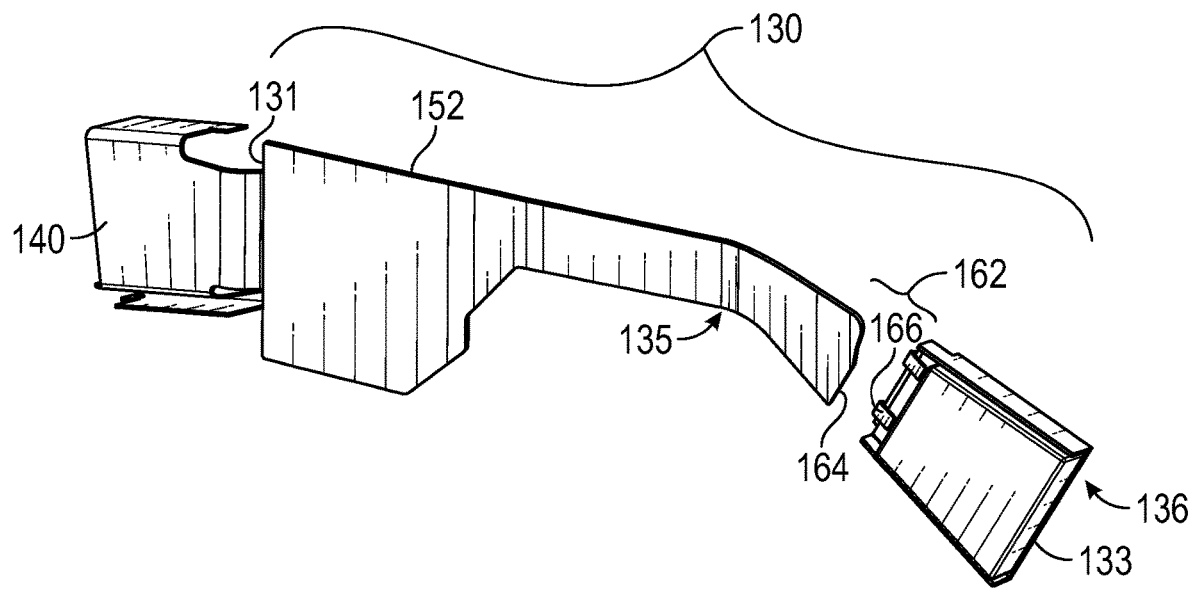
FIG. 10A is a perspective view of another configuration of the thermal management device in accordance with an example.

FIG. 10A is a perspective view of another example of the electronic eyewear device 100 showing the general spatial arrangement of heat source 132, thermal coupling 134, and heat sink 136. The heat source 132 acquires heat from nearby onboard electrical components, such as a printed circuit board, housed within one or both of the compartments 113a, 113b. In this configuration, the thermal coupling 134 of device 130 has end 164 that extends towards heat sink 136 past angled portion 135 but does not contact heat sink end 166, thereby creating a gap 162 in between. Heat dissipates from the thermal coupling 134 through the internal cavity of the temple to the heat sink 136. In some examples, the gap 162 is approximately $\frac{1}{20}$ to $\frac{1}{10}$ the overall distance between the first and seconds ends 131, 133 of device 130, and in one example, the gap 162 is about $\frac{1}{18}$ the overall distance between the first and second ends 131, 133. In this example, the thermal margin is increased by about 40%. In some examples, the thermal margin is increased by between 35% and 45%. In other examples, the thermal margin is increased more than 45%. As shown, the thermal coupling has a substantially square area that tapers to a narrower rectangular portion which extends past its angled portion 135 before terminating at its distal end 164.

Figure 10B:
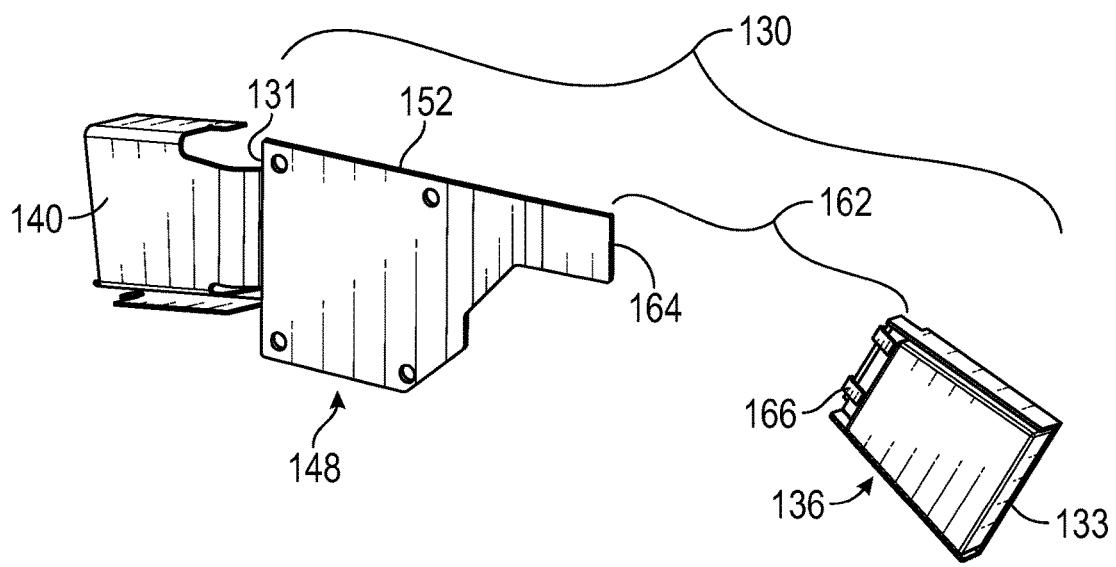
FIG. 10B is a perspective view of another configuration of a thermal management device in accordance with an example.

FIG. 10B is a perspective view of another configuration of the example shown in FIG. 10A. As illustrated, the thermal coupling extends towards heat sink 136 but ends before reaching angled portion 135, thereby also creating a gap 162 between thermal coupling end 164 and heat sink end 166 like the configuration shown in FIG. 10 but substantially wider. In one example, the gap 162 is about $\frac{1}{3}$ to $\frac{1}{4}$ the overall distance between the first and second ends 131, 133.

Figure 11:
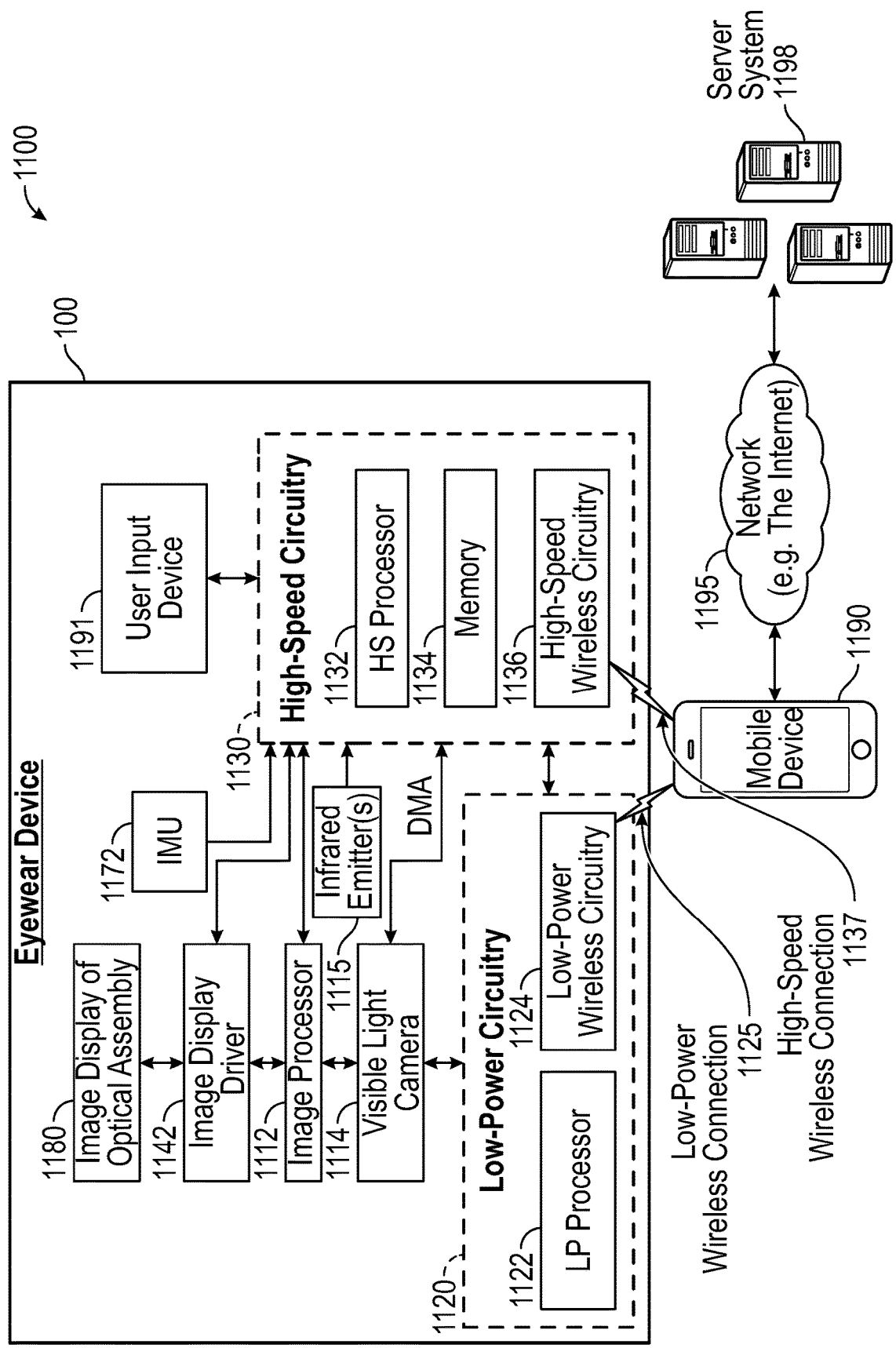
FIG. 11 is a diagrammatic representation of an example acoustic circuitry and use of an eyewear electronic device in communication with a mobile device and a server system connected via various networks.

FIG. 11 is a block diagram that depicts example circuitry provided by components of the electronic eyewear device 100, which may be located on one or more circuit boards located in the eyewear body 110, including compartments 113a, 113b. As shown, circuitry 1130 includes a high-speed processor 1132, a memory 1134, and high-speed wireless circuitry 1136. In the example, the image display driver 1142 is coupled to the high-speed circuitry 1130 and operated by the high-speed processor 1132 in order to drive the left and right image displays of electronic eyewear device 100 having optical assemblies. High-speed processor 1132 may be any processor capable of managing high-speed communications and operation of any general computing system needed for electronic eyewear device 100. High-speed processor 1132 includes processing resources needed for managing high-speed data transfers on high-speed wireless connection 1137 to a wireless local area network (WLAN) using high-speed wireless circuitry 1136. In certain examples, the high-speed processor 1132 executes an operating system such as a LINUX operating system or other such operating system of the electronic eyewear device 100 and the operating system is stored in memory 1134 for execution. In addition to any other responsibilities, the high-speed processor 1132 executes a software architecture for the electronic eyewear device 100 that is used to manage data transfers with high-speed wireless circuitry 1136. In certain examples, high-speed wireless circuitry 1136 is configured to implement Institute of Electrical and Electronic Engineers (IEEE) 802.11 communication standards, also referred to herein as Wi-Fi. In other examples, other high-speed communications standards may be implemented by high-speed wireless circuitry 1136.

The low-power circuitry 1120 includes a low-power processor 1122 and low-power wireless circuitry 1124. The low-power wireless circuitry 1124 and the high-speed wireless circuitry 1136 of the electronic eyewear device 100 can include short range transceivers (Bluetooth™) and wireless wide, local, or wide-area network transceivers (e.g., cellular or WiFi). Mobile device 1190, including the transceivers communicating via the low-power wireless connection 1125 and the high-speed wireless connection 1137, may be implemented using details of the architecture of the electronic eyewear device 100, as can other elements of the network 1195.

Memory 934 includes any storage device capable of storing various data and applications, including, among other things, camera data generated by camera(s), the image processor 1112, and images generated for display by image display driver 1142 on the image display of optical assemblies. Although the memory 1134 is shown as integrated with high-speed circuitry 1130, the memory 1134 in other examples may be an independent, standalone element of the electronic eyewear device 100. In certain such examples, electrical routing lines may provide a connection through a chip that includes the high-speed processor 1132 from the image processor 1112 or low-power processor 1122 to the memory 1134. In other examples, the high-speed processor 1132 may manage addressing of memory 1134 such that the low-power processor 1122 will boot the high-speed processor 1132 any time that a read or write operation involving memory 1134 is needed.

As shown, the high-speed processor 1132 of the electronic eyewear device 100 can be coupled to the camera system, the image display driver 1142, the user input device 1191, and the memory 1134.

The output components of the electronic eyewear device 100 include visual elements, such as the left and right image displays associated with each lens or optical assembly (not shown), a plasma display panel (PDP), a light emitting diode (LED) display, a projector, or a waveguide. The eyewear device 100 may include a user-facing indicator (e.g., an LED or a vibrating actuator), and an outward-facing signal (e.g., an LED). The image displays 1180 of each optical assembly are driven by the image display driver 1142. In some example configurations, the output components of the electronic eyewear device 100 further include additional indicators such as tactile components (e.g., an actuator such as a vibratory motor to generate haptic feedback), and other signal generators. The user-facing set of indicators are configured to be seen or otherwise sensed by the user of the device 100. For example, the device 100 may include an LED display positioned so the user can see it, a loudspeaker positioned to generate a sound the user can hear, or an actuator to provide haptic feedback the user can feel. The outward-facing set of signals are configured to be seen or otherwise sensed by an observer near the device 100. Similarly, the device 100 may include an LED, a loudspeaker, or an actuator that is configured and positioned to be sensed by an observer.

The input components of the eyewear device 100 may include alphanumeric input components (e.g., a touch screen or touchpad configured to receive alphanumeric input, a photo-optical keyboard, or other alphanumeric-configured elements), pointer-based input components (e.g., a mouse, a touchpad, a trackball, a joystick, a motion sensor, or other pointing instruments), tactile input components (e.g., a button switch, a touch screen or touchpad that senses the location, force, or both of touches or touch gestures, or other tactile-configured elements), and audio input components (e.g., a microphone), and the like. The mobile device 1190 and the server system 1198 may include alphanumeric, pointer-based, tactile, audio, and other input components.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. An electronic eyewear device comprising:
   an eyewear body comprising a frame configured to be worn on the head of a user, the frame comprising an optical elements section and spaced-apart first and second temples, each temple extending rearwardly from the optical elements section and terminating at a temple end portion;

onboard electronic components carried by the eyewear body at a first portion and comprising a heat source that generates heat during electrically powered operation thereof; and a thermal management device that receives heat from the heat source, comprising:

a heat sink within the first temple at a second portion of the eyewear body separated from the first portion by an angled portion extending therein between, wherein the second portion includes the temple end portion; and a substantially planar thermal coupling disposed within the first temple being thermally coupled to the heat sink, the thermal coupling comprising a first section and a second section and having substantially parallel first and second edges, wherein the second edge of the first section substantially tapers towards the first edge to form a narrower portion of the thermal coupling, and wherein the heat sink in the second portion comprises a battery shield substantially housed within the temple end portion.

2. The electronic eyewear device of claim 1, wherein the first and second temples each comprise a main portion and an ear portion, and the thermal coupling is substantially contained in the main portion of the first temple.

3. The electronic eyewear device of claim 2, wherein the heat sink is substantially contained in the ear portion of the first temple.

4. The electronic eyewear device of claim 1, wherein the thermal coupling comprises a vapor chamber.

5. The electronic eyewear device of claim 4, wherein the vapor chamber is in thermal communication with at least one thermal spreader.

6. The electronic eyewear device of claim 5, wherein the at least one thermal spreader is affixed to or at least partially coats the vapor chamber.

7. The electronic eyewear device of claim 6, wherein the at least one thermal spreader is affixed to a carrier.

8. The electronic eyewear device of claim 7, wherein the carrier is made of a conductive material.

9. The electronic eyewear device of claim 5, wherein the at least one thermal spreader comprises graphite.

10. The electronic eyewear device of claim 4, wherein the vapor chamber directly contacts the heat sink.

11. The electronic eyewear device of claim 1, wherein the thermal management device further comprises a heat sink within the second temple.

12. The electronic eyewear device of claim 11, wherein the thermal management device further comprises a thermal coupling disposed within the second temple that is thermally coupled to and extending between the heat source and the heat sink.

13. The electronic eyewear device of claim 1, wherein the thermal coupling extends through the angled portion and contacts the heat sink.

14. The electronic eyewear device of claim 1, wherein the first portion comprising the heat source and the second portion comprising the heat sink are physically separated by a gap.

15. A wearable device comprising:

an eyewear body comprising at least one compartment and a first temple, wherein the first temple extends rearwardly from the at least one compartment and terminating at a temple end portion;

onboard electronic components positioned within the at least one compartment and comprising at least one heat source that generates heat during electrically powered operation of the components; and a thermal management device that receives heat from the heat source, comprising:

a heat sink within the temple end portion of the first temple, wherein the heat sink comprises a battery shield substantially housed within the temple end portion; and a substantially planar thermal coupling disposed within the first temple and thermally coupled to the heat sink, the thermal coupling comprising a first section and a second section and having substantially parallel first and second edges, wherein the second edge of the first section substantially tapers towards the first edge to form a narrower portion of the thermal coupling.

16. The wearable device of claim 15, wherein the thermal coupling comprises a vapor chamber.

17. The wearable device of claim 16, wherein the vapor chamber is in thermal communication with at least one thermal spreader.

18. The wearable device of claim 16, wherein the vapor chamber contacts the heat sink.

19. The wearable device of claim 15, wherein the eyewear body further comprises:

a second heat source; and a second temple, wherein the second temple comprises a second thermal management device that includes a second heat sink and second thermal coupling, and wherein the second thermal coupling is thermally coupled to and extending between the second heat source and the second heat sink.

\* \* \* \* \*